April 5, 1927.

W. LA HODNY

MIRROR BRACKET

Filed Sept. 6, 1923

1,623,483

2 Sheets-Sheet 1

Inventor
William La Hodny
by Poff & Pocaert
Attorneys

April 5, 1927.
W. LA HODNY
MIRROR BRACKET
Filed Sept. 6, 1923   2 Sheets-Sheet 2
1,623,483
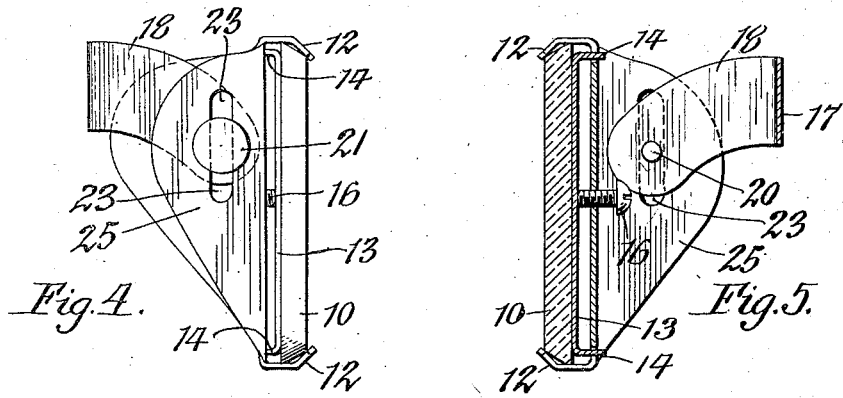
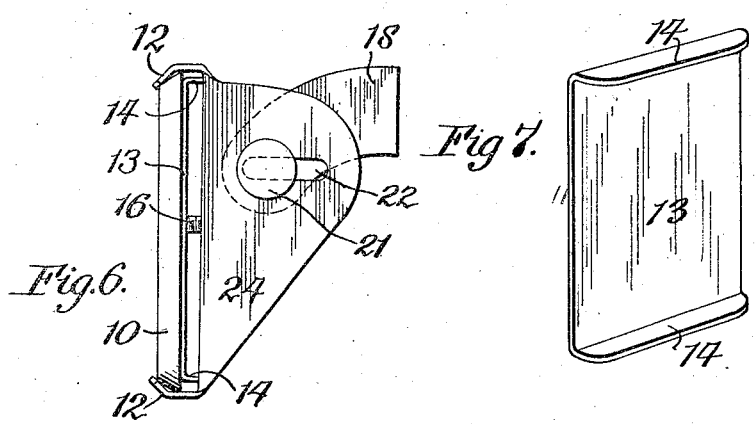
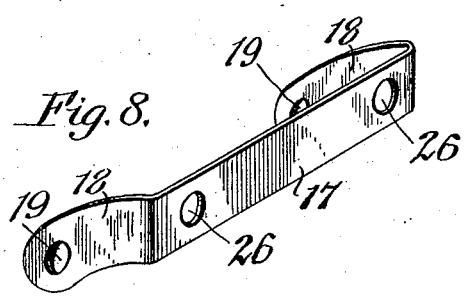
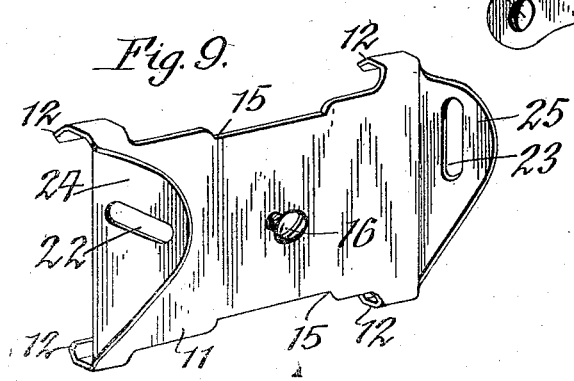
Inventor.
William La Hodny
by Topp & Powers
Attorneys Patented Apr. 5, 1927.

1,623,483

UNITED STATES PATENT OFFICE.

WILLIAM LA HODNY, OF BUFFALO, NEW YORK, ASSIGNOR TO STANDARD MIRROR COMPANY, OF BUFFALO, NEW YORK, A CORPORATION OF NEW YORK.

MIRROR BRACKET.

Application filed September 6, 1923. Serial No. 661,128.

This invention relates to a mirror bracket which is more particularly designed for supporting a rear view mirror on the wind shield of an automobile, although the same may also be used for other purposes if desired.

Its object is to provide a bracket of this character which is simple in construction, low in cost to manufacture and capable of being readily adjusted into any desired angle, within certain limits, as best suits the requirements of the driver to enable him to obtain a clear view of the road in rear of his car.

Figure 1:
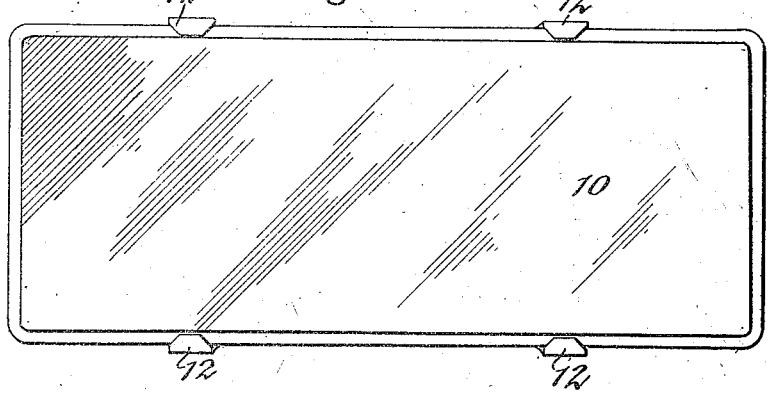
Figure 2:
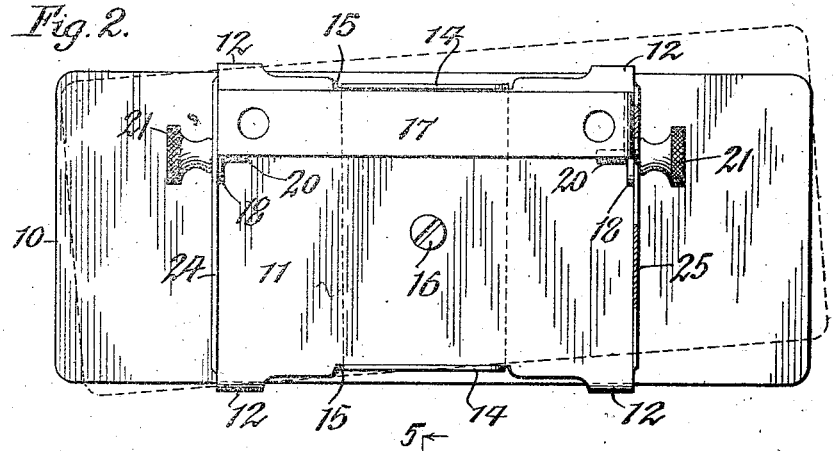
Figure 3:
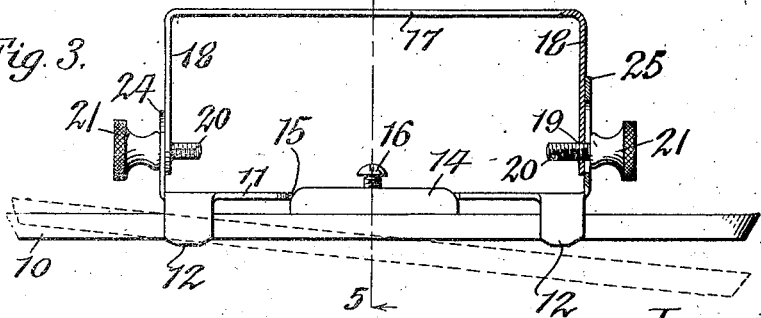

In the accompanying drawings:

Figure 1 is a front elevation of a mirror mounted on my improved bracket. Figure 2 is a rear elevation of the same. Figure 3 is a top plan view thereof, partly in section. Figure 4 is an end view viewed from the left hand end of the bracket and mirror. Figure 5 is a vertical section taken on the correspondingly numbered lines in Figure 3. Figure 6 is an end view of the mirror bracket and the mirror supported thereon viewed from the right thereof. Figure 7 is a perspective view of the presser plate forming part of the head which supports the mirror. Figure 8 is a perspective view of the base portion of the bracket. Figure 9 is a similar view of the head portion of the bracket.

Similar reference characters refer to like parts in the several figures.

In its general organization this mirror bracket comprises a head upon which the mirror is supported, a base adapted to be supported upon the wind shield of the automobile or other available support, and adjusting means interposed between the head and the base and so constructed that the mirror can be adjusted into various angles as best suits the requirements of the driver.

The mirror 10 in the present instance is constructed of oblong form with its length arranged horizontally and its width vertically, but it is to be understood that this bracket is suitable for supporting mirrors of other shapes. The bracket head consists of an upright supporting plate 11 which is adapted to be arranged in rear of the mirror and provided at its upper and lower horizontal edges adjacent to the corners thereof with forwardly projecting hooks 12 which are adapted to overhang the upper and lower horizontal edges of the mirror and confine the same against vertical as well as forward and backward displacement thereon. The mirror is also held against horizontal and longitudinal displacement on the supporting plate. The mirror is also pressed forwardly against the hooks 12 by a presser plate 13 engaging with the rear side of the mirror, and a presser or clamping screw 16 which works with its threaded shank in a screw threaded opening in the central part of the supporting plate 11 and bears against the rear side of the presser plate. In order to prevent the presser plate from moving vertically with reference to the supporting plate 11 the upper and lower edges of this presser plate are provided with rearwardly projecting flanges 14 which overhang the upper and lower edges of the supporting plate.

For the purpose of confining the presser plate on the central part of the supporting plate 11, the upper and lower edges of the latter are provided with notches 15, 15 in which the flanges 14, 14 of the presser plate 13 are arranged, thereby forming shoulders at opposite ends of each of these notches which are adapted to be engaged by the corresponding ends of the flanges 14 and thereby confine the presser plate against horizontal, longitudinal displacement relatively to the supporting plate and causing the pressure of the same to be applied against the central part of the mirror and distributing this pressure uniformly thereagainst. At its opposite vertical edges the supporting plate 11 is provided with two rearwardly projecting upright ears or flanges or lugs 24 and 25, these lugs together with the supporting plate 11 and its hooks 12 being preferably constructed integrally from a single sheet of sheet metal by stamping in any suitable and well-known manner. One of these lugs of the supporting plate, for instance, the lug 24 is provided with a horizontal slot 22 and the other lug 25 is provided with a vertical slot 23, as shown in Figures 4, 5, 6 and 9.

The base of this bracket may be variously constructed but in the present case the same comprises a horizontal flat bar 17 which may be attached to a suitable support, such as the frame of a wind shield, by means of screws passing through openings 26 in this bar, and at its opposite ends this base bar is provided with forwardly and downwardly projecting lugs 18, 18, each of which is provided at its front end with an internally screw threaded opening 19. The lugs of the base engage with the inner opposing sides of the lugs 24 and 25 of the head of the bracket, as shown for example in Figures 2 and 3. Each of the lugs of the base is connected with one of the lugs of the head of the bracket by means of a clamping or fastening screw which is provided with an externally screw threaded shank 20 passing through one of the slotted lugs of the head and working in the threaded opening 19 of one of the base lugs, while the head or thumb piece 20 of this screw bears against the outer side of the respective lug on the supporting plate 11.

It follows from this construction that the shank of one of the clamping screws passes through the horizontal slot 22 of the lug 24 on the supporting plate, while the screw threaded shank of the other clamping screw passes through the vertical slot 23 of the lug 25 on this supporting plate.

Due to this construction the supporting plate, upon loosening the screws at both ends of the bracket, can be adjusted horizontally on one of the base lugs 18 and vertically on the other base lug, thereby producing in effect a universal joint or connection between the base and the head of the bracket whereby the mirror may be adjusted into any desired angularity, within certain limits, relatively to the wind shield as best suits the needs of the driver to enable him to obtain a good view in rear of his car. After the mirror has been thus adjusted the same is held in place by tightening both of the clamping screws. In Figure 2 the mirror is shown by full lines in a horizontal position and by dotted lines the same is represented tilted somewhat in a vertical direction. In Figure 3 the mirror is represented by full lines in a position parallel with the longitudinal bar 17 of the bracket which corresponds to the plane of the wind shield, while the dotted lines represent the mirror tilted horizontally so that it stands at an angle with reference to the plane of the wind shield.

It will therefore be apparent that between these two adjustments the bracket has the capacity of being adjusted into any desired angularity and that this is accomplished by means which are very simple in construction, not liable to get out of order and capable of being manipulated easily and conveniently.

Moreover, owing to the few number of parts which enter into the construction of this mirror bracket, the same can be produced at very low cost without sacrificing any desirable features which should be present in a mirror bracket of this character.

I claim as my invention:

1. A mirror bracket comprising a main supporting plate provided at its opposite edges with forwardly projecting hooks adapted to engage over the opposite edges of a mirror, a presser plate adapted to engage with the rear side of the mirror and having flanges which project rearwardly away from the mirror and engage over opposite edges of the supporting plate, and means for adjusting said presser plate relatively to said supporting plate.

2. A mirror bracket comprising a main supporting plate provided at its opposite edges with forwardly projecting hooks adapted to engage over the opposite edges of a mirror, and said supporting plate being provided with notches on the corresponding edges which have hooks, a presser plate adapted to bear against the rear side of the mirror and provided at its opposite edges with rearwardly projecting flanges which engage with the notches of said supporting plate, and means for adjusting said presser plate relatively to said supporting plate.

WILLIAM LA HODNY.